United States Patent [19]
Evans et al.

[11] Patent Number: 5,572,215
[45] Date of Patent: Nov. 5, 1996

[54] DIGITAL DATA PROCESSOR

[75] Inventors: Norol T. Evans, San Pedro; Duane R. Ritchie, La Mirada, both of Calif.

[73] Assignee: Hughes Aircraft Company, Los Angeles, Calif.

[21] Appl. No.: 634,024

[22] Filed: Apr. 13, 1967

[51] Int. Cl.[6] .................................................. G01S 7/34
[52] U.S. Cl. ............................. 342/195; 342/19; 342/92; 342/95; 342/197
[58] Field of Search ........................ 340/172.5, 347 A–D; 235/92–25, 92–53, 92–66; 343/5 DP; 342/16, 17, 19, 90, 92, 95, 97, 194, 195, 197

[56] References Cited

U.S. PATENT DOCUMENTS

| | | | |
|---|---|---|---|
| 3,391,403 | 7/1968 | Phillips, Jr. .............................. | 342/197 |
| 3,392,305 | 7/1968 | Andersson et al. ...................... | 315/367 |
| 3,392,386 | 7/1968 | Evans et al. .............................. | 342/93 |
| 3,399,404 | 8/1968 | Githens et al. ........................... | 342/90 |
| 3,460,137 | 8/1969 | Ralston .................................... | 342/94 |
| 3,521,277 | 7/1970 | Evans ....................................... | 342/195 |

*Primary Examiner*—John B. Sotomayor
*Attorney, Agent, or Firm*—Georgann S. Grunebach; Michael W. Sales; Wanda K. Denson-Low

[57] ABSTRACT

A plurality of threshold detectors is provided to pass analog signals of predetermined and varying threshold values. An analog to digital converter converts these analog signals to binary 1s and 0s. A target detected on each radar beam sweep is a 1 and no target is a 0. These binary numbers are then stored in a reversible up-down counter. At the first signal received, the counter counts up on hits (binary 1) and counts down on misses (binary 0). When the contents of the counter reaches a predetermined count, a target's leading edge is declared. At this time, the counter is then reset and proceeds to count up on misses and down on hits until the aforesaid predetermined count is attained, wherein a trailing edge is then declared.

27 Claims, 7 Drawing Sheets

5,572,215

DIGITAL DATA PROCESSOR

Synthetic means reproduces the target's azimuth by displaying the detected leading edge and trailing edges.

This invention relates to digital data processors and more particularly to a novel and improved data processor which digitally extracts and processes data from real time analog detection systems.

The present invention provides a digital system which is useful for preventing the extraction and reporting of sidelobe strobes in electronic countermeasures moderate jamming environments for radar systems or the like.

Too, this invention provides for displaying synthetic arrays generated by digital techniques. Such displays are free of the jamming noise environments created by countermeasure techniques of incoming jamming vehicles.

As is well known in the art, when a radar countermeasure technique, such as electronic jamming signal, approaches a radar receiver, more and more jamming signals enter the receiver via sidelobes, and more interference appears on display devices such as the Plan Position Indicator (PPI).

In radar systems which use automatic threshold detectors which declare a target's presence when the received signal crosses a predetermined threshold, the presence of a noise jamming signal can increase the rate of false alarms to an intolerable extent. When radar data processing equipment consists of automatic devices such as a computer, such device might be overloaded by the added false alarms due to the jamming noise.

Analog devices such as azimuth vs amplitude (AVA) techniques provide for the display jammer energy vs azimuth on PPI displays. Unfortunately, though, no method is provided for extracting jam-strobe data and eliminating the sidelobe data without the use of manual intervention.

Some digital techniques have been provided which report jam-strobes automatically but no means have heretofore been provided in these digital techniques to automatically reject the sidelobe strobes. So these prior art techniques operate on a single fixed threshold with no operator control for adjusting the threshold of the automatic detector to compensate for the increased RMS noise. These techniques also provide no adequate means for displaying the jam patterns or the extracted reports.

The present invention provides a digital technique which is capable of displaying an AVA plot in a manner similar to the aforesaid prior art. It is also possible by this invention to automatically beamsplit all lobes, that is, the mainlobes as well as the sidelobes, to select and display the incoming jamming signal and subsequently reject the sidelobe jamming signal. The trailing edge position of the reported strobes can be displayed to the operator in real time as azimuth spokes which have lengths proportionate to the jamming amplitude.

Briefly described, the present invention provides a plurality of analog signal amplitude threshold level detectors, each detector is set at a predetermined threshold value and passes signals which exceed the threshold. Means are then provided on each input channel to convert these analog signals to electrical signals of predetermined binary weighted digital values. This includes a reversible up-down counter on each channel which is incremented in an increasing value when there is a signal detected by its associated threshold detector and is incremented down in value when a signal is not detected by the associated threshold detector.

When a counter reaches a predetermined count, logic circuit is enabled which displays only the mainlobe and sidelobes on a PPI or the like. As the input signal becomes stronger, a higher value threshold detector is enabled and a count starts in its associated counter. When the predetermined count is attained its associated logic is enabled and previous counters are disenabled. Means is also provided to display certain range intervals by an associated range selector.

Output signals from gates which are provided to declare a leading edge and a trailing edge can be summed and divided by two to beamsplit the radar lobes to determine the accurate location of the target. This can then be presented to a tracking computer for more accurate position data.

It therefore becomes one object of this invention to provide a novel and improved data processor useful with displaying the azimuth position of an electronic countermeasure target.

Another object of this invention is to provide a novel and improved digital data processor which detects a jamming target azimuth position in the presence of jamming noise environment.

Another object of this invention is to provide a novel and improved digital data processor useful in radar systems which automatically processes incoming jamming signals and distinguishes the leading and/or trailing edges of jamming signals in the presence of jamming noise environments.

Another object of this invention is to provide a novel and improved digital data processor which is useful in radar systems to display the main lobe jamming signal on a PPI or the like, as well as distinguishing and/or rejecting the sidelobes thereof.

These and other objects, features and advantages will become apparent to those skilled in the art when referring to the following detailed description of one preferred embodiment and referenced to the following figures illustrating a preferred embodiment of this invention wherein.

Figure 1:
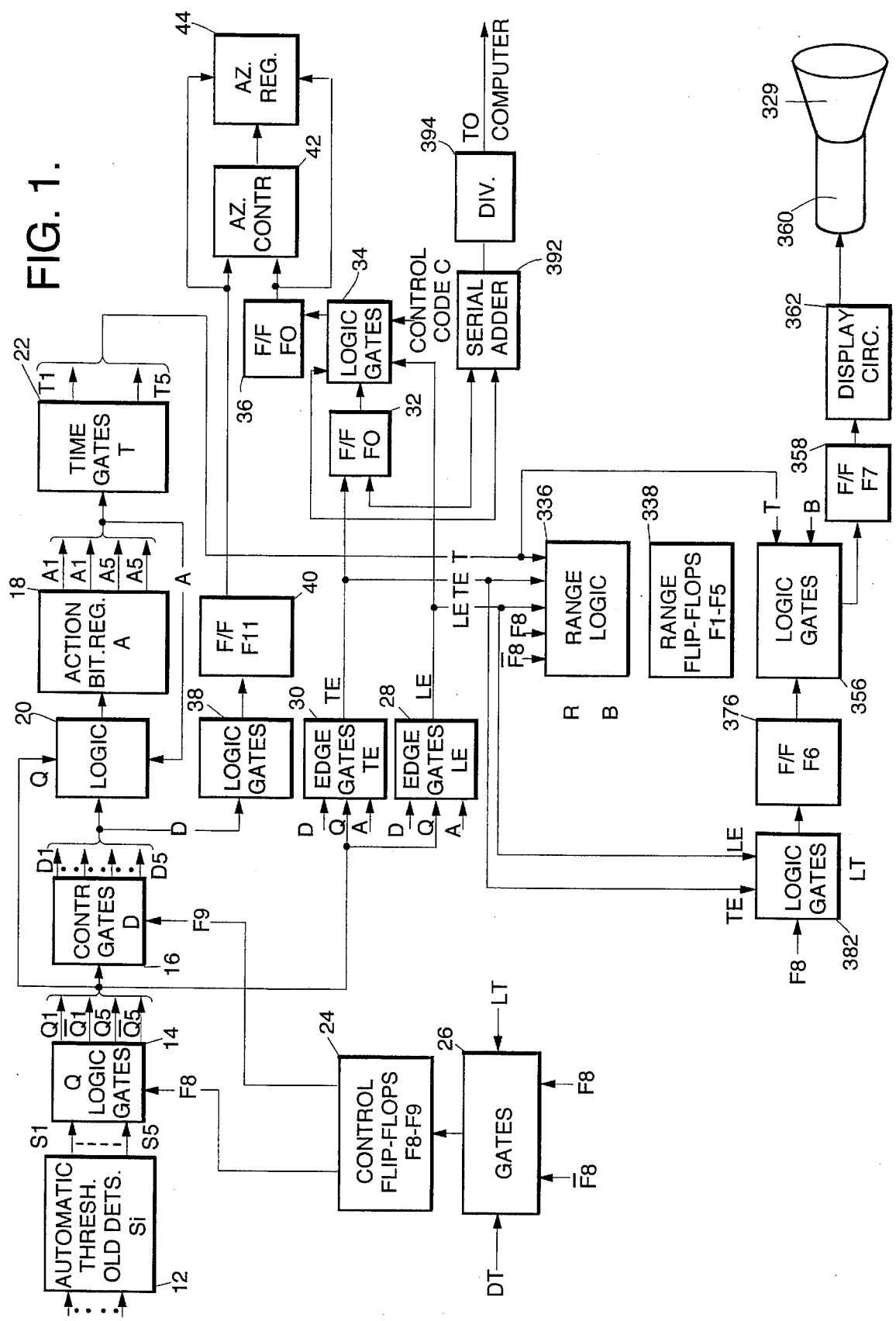
FIG. 1 is a block diagram of a preferred embodiment of this invention.

The following is a list of terms and their definitions used in conjunction with the description of the preferred embodiment which follows:

$S1$ = signal indicating 12 db threshold exceeded  
$S2$ = signal indicating 24 db threshold exceeded  
$S3$ = signal indicating 36 db threshold exceeded  
$S4$ = signal indicating 48 db threshold exceeded  
$S5$ = signal indicating 60 db threshold exceeded } From threshold detector 12 of FIG. 1

Figure 2:
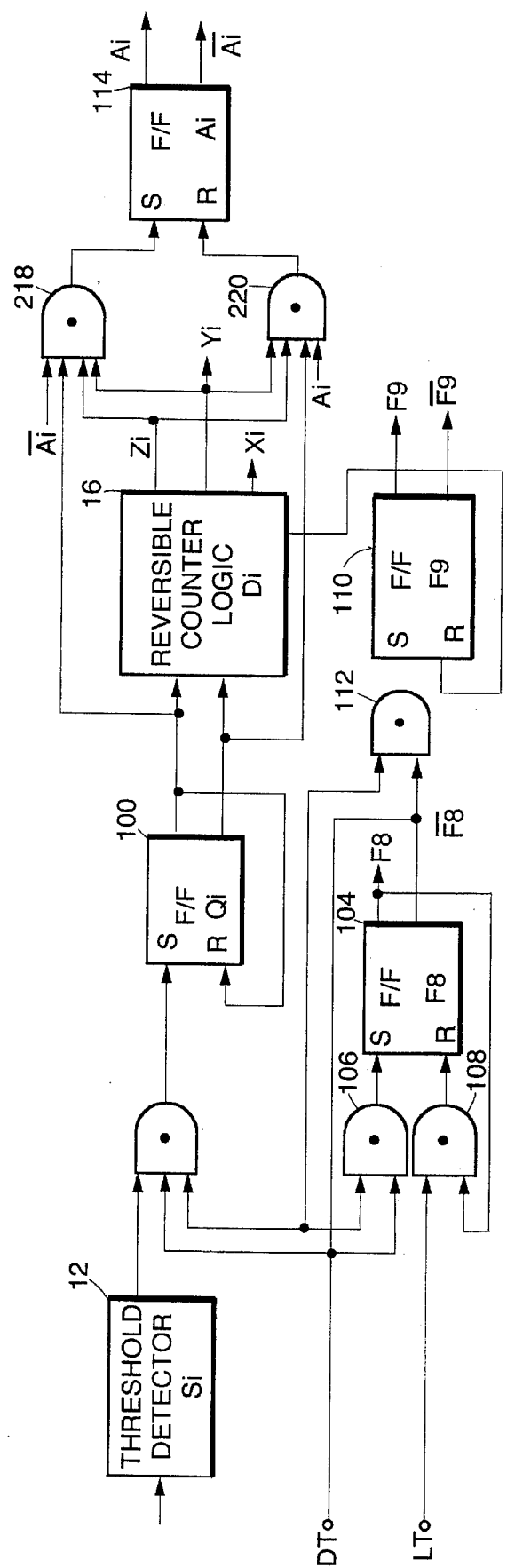
FIG. 2 is a block diagram and logic diagrams of portions of the preferred embodiment of FIG. 1.

-continued $Q1 = 12$ db level  
$Q2 = 24$ db level  
$Q3 = 36$ db level   } $Qi$ flipflops 100 of  FIG. 1  
$Q4 = 48$ db level       $Qi$ logic gates 14   and FIG. 2  
$Q5 = 60$ db level $F8$ = control from $F8$ flipflop 104, FIG. 2  
$F9$ = control from $F9$ flipflop 110, FIG. 2

Figure 3:
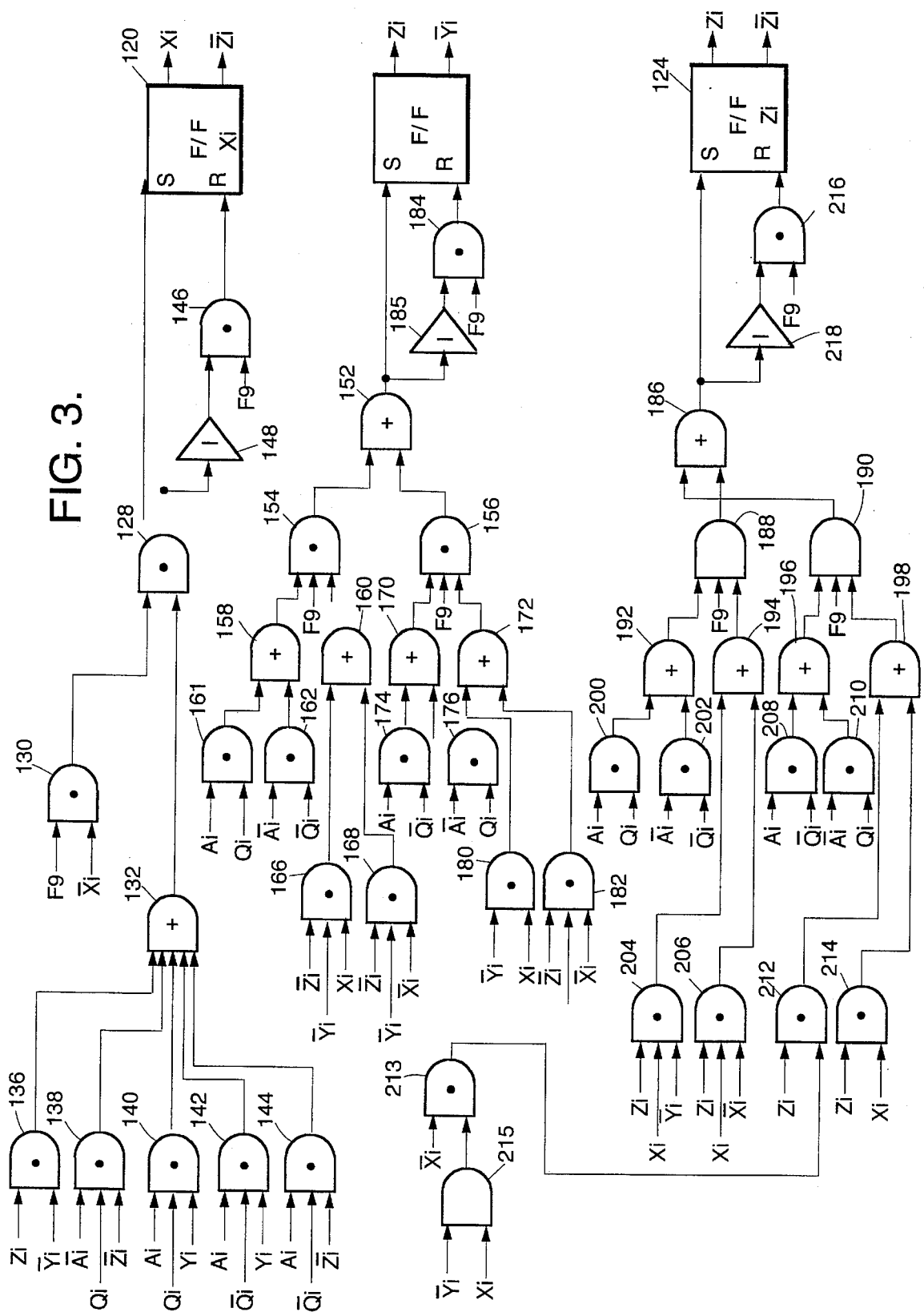
FIG. 3 is an illustration of the D counter and logic gates of FIG. 1.

$Xi$ = the LSD of the $Di$ counter and $Xi$ flipflop 120  
$Yi$ = the second LSD of the $Di$ counter $Yi$ flipflop 122   } FIG. 3  
$Zi$ = the MSD of the $Di$ counter $Zi$ flipflop 124  
where $i = 1, 2, 3, 4,$ or $5$ ($1 = 60$ db, $5 = 12$ db)

$Ai$ = the action bit from $Ai$ register, FIG. 1 and FIG. 2

Figure 6:
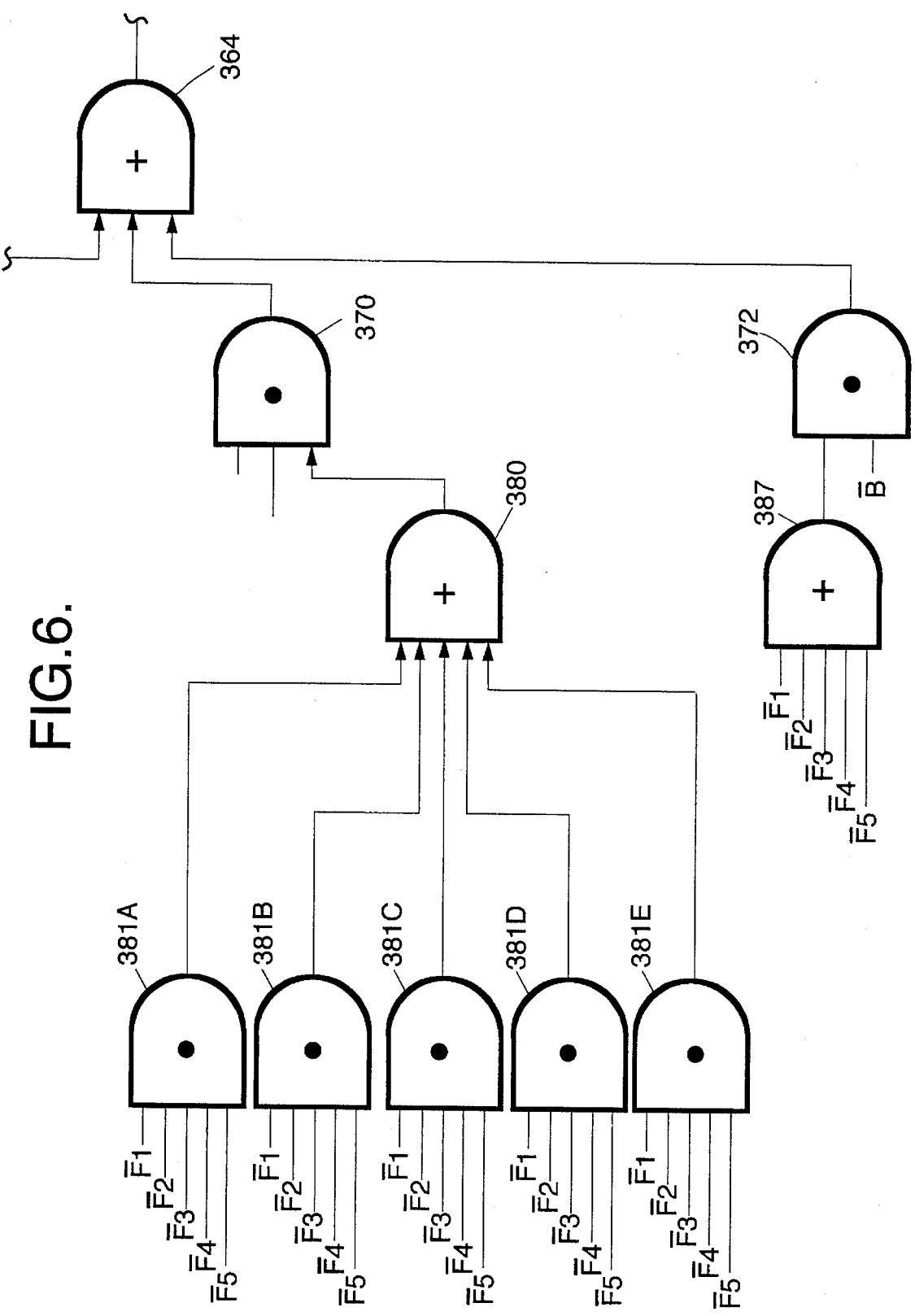
FIG. 6 illustrates the control flip flop F6 and F7 and the logic gates used therewith for supplying video display intensities to the PPI.
Figure 12:
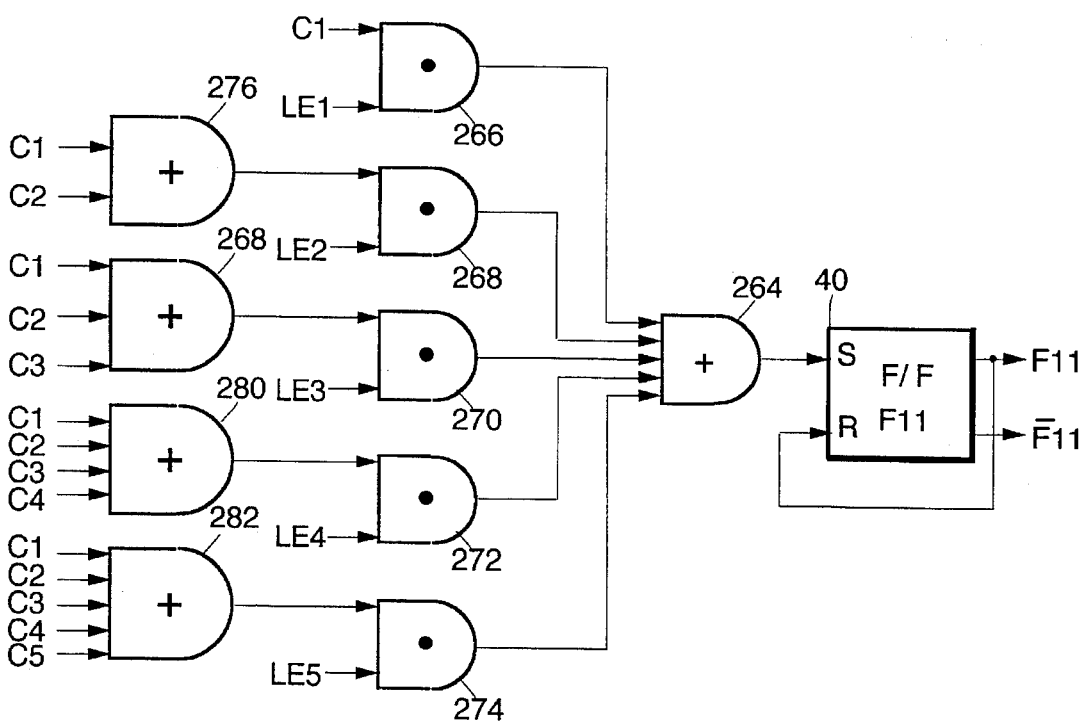
FIG. 12 illustrates the control flip flop F11 and the logic diagram therewith for copying the leading edge of the target for storing in the azimuth counter and register.
Figure 10:
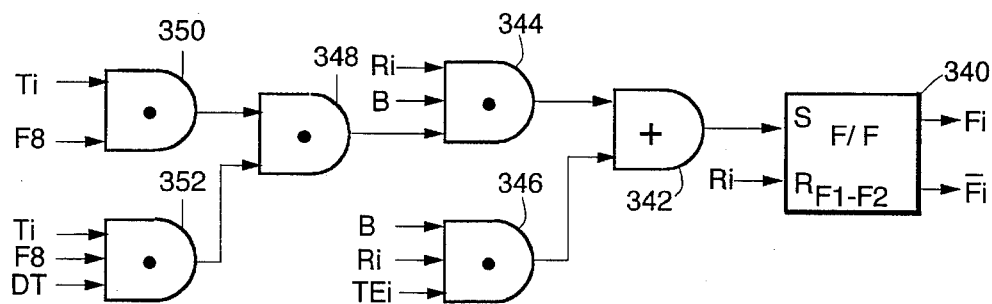
FIG. 10 is an illustration of a typical range logic and flip flop F1–F5 for displaying various ranges on the PPI.
Figure 11:
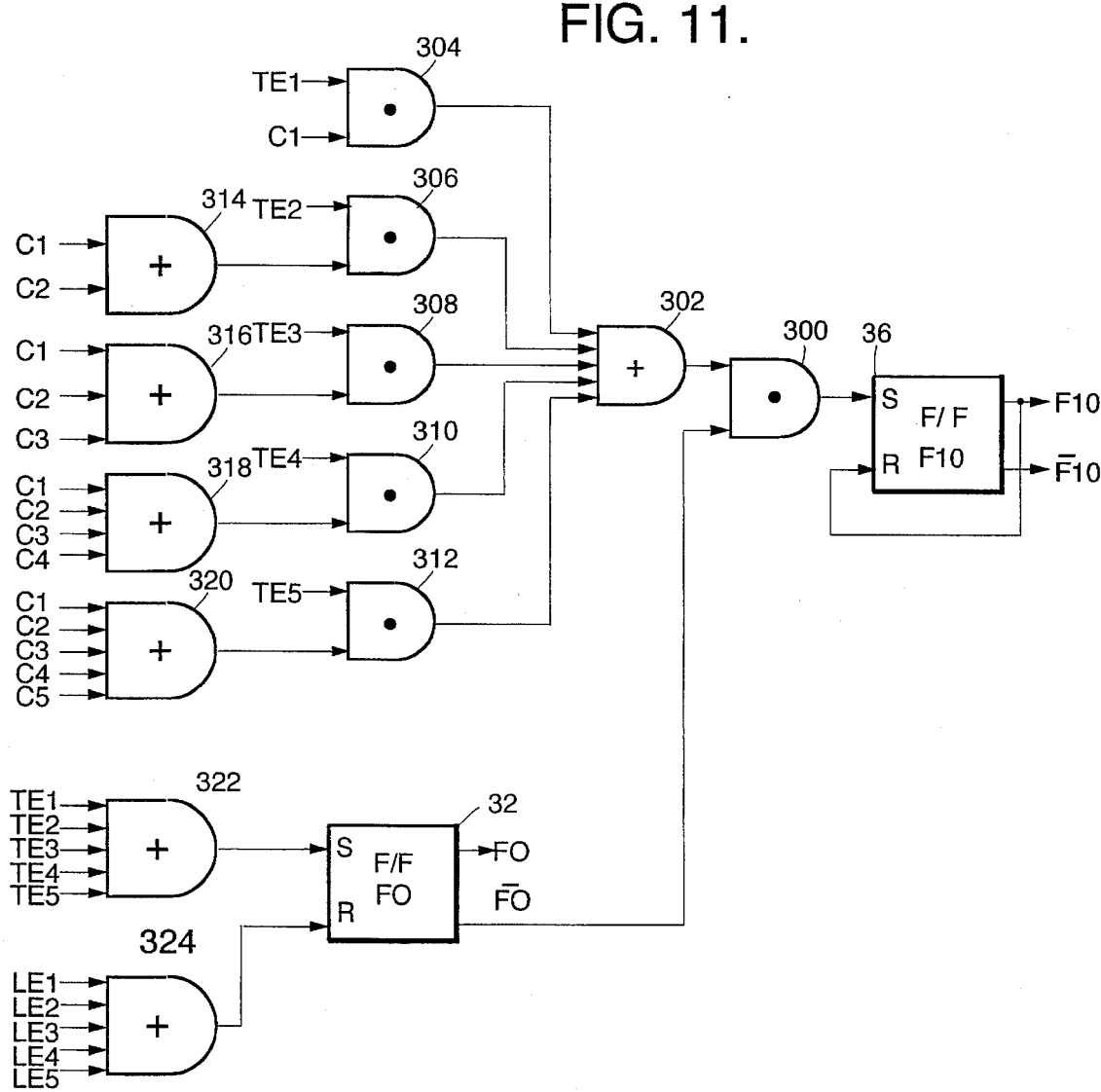
FIG. 11 illustrates the control flip flop F10 and the leading edge or trailing edge flip flop F0 and associated logic gates used for transferring targets to the azimuth counter.

$F1$ = Range Gate control $F1$ flipflop  
$F2$ = Range Gate Control $F2$ flipflop  
$F3$ = Range Gate Control $F3$ flipflop   } FIG. 10  
$F4$ = Range Gate Control $F4$ flipflop  
$F5$ = Range Gate Control $F5$ flipflop $F6$ = Control $F6$ flipflop   } FIG. 6  
$F7$ = Display $F7$ flipflop $F0$ = Control $F0$ flipflop   } FIG. 11  
$F10$ = Copy Trailing Edge flipflop $F11$ = Copy Leading Edge flipflop   FIG. 12

$LT$ = Radar Live time signal  
$DT$ = Radar Dead time signal $R40$ = 40 mile range ring signal  
$R80$ = 80 mile range ring signal  
$R120$ = 120 mile range ring signal   } To $F1$–$F5$ flipflops  FIG. 10  
$R160$ = 160 mile range ring signal  
$R200$ = 200 mile range ring signal $B$ = Display Jamming Outline   } Operator Toggle Switch  
$\bar{B}$ = Display Trailing Edges only Turning now to a more detailed description of this invention, there is shown in FIG. 1 a plurality of automatic threshold detectors 12 which is enabled by an AVA or other similar input devices and compares the input signals therefrom with an RMS noise level reference and provides the output terms S1–S5, for example, to logic gates 14. Automatic threshold detectors of this type are well known in the art and in this embodiment is implemented at five amplitude levels to perform the detection operations. Selected amplitude levels for this embodiment may be of the following:

$S1 = +12$ db above rms noise $S2 = +24$ db above rms noise $S3 = +36$ db above rms noise $S4 = +48$ db above rms noise $S5 = +60$ db above rms noise In operation of the automatic threshold detector 12, the signal from a log receiver is sampled and averaged during the last half of each range sweep. The average amplitude level is time compared to the five threshold circuits contained therein which are set to the levels as indicated above. If a threshold is exceeded in any of the five detector circuits, one of the outputs S1–S5 is enabled accordingly.

Logic gates within Q logic gates 14 provide a plurality of outputs Q1–Q5 for enabling D counter 16. As the threshold is exceeded, a digital 1 is sent to D counter 16, which may be a reversible three-bit counter, during radar dead time (DT). If a threshold level is not exceeded, a digital zero is sent to the D counter 16.

An A register 18, which stores an action bit indicating main lobe detection, is enabled by logic circuits 20. A register 18 provides the output terms A1–A5. These outputs are coupled back into logic 20 and also to T time gates 22, which in turn provides the outputs T1–T5.

Q logic gates 14 and counter 16 are in turn controlled by F8–F9 control flipflops 24, which in turn are enabled by logic gates 26. Gating logic 26 is enabled by the radar dead time (DT), radar live time (LT), and/or the F8 terms from F8 control flipflop 24. This gating logic 26 provides that F8 is true for all of the dead time of the radar and F9 is true only for one clock time.

Here it should be noted, although not specifically shown, that all flipflops used in this embodiment may be of the JK type which require a clock pulse present before the flipflops can change states.

The logic diagrams shown for implementing above portions of the embodiment of FIG. 1 are illustrated in FIG. 2 and will be taken into more detail later as the description of this preferred embodiment proceeds.

Outputs Q1–Q5 from Q logic gates 14 are coupled to logic circuit 20 and also to LE and TE edge gates 28 and 30, and the outputs therefrom are used to enable F0 flipflop 32. LE and TE indicate leading and trailing edges of the signal to be displayed.

Control codes are provided from extraneous circuitry which enables logic gates 34 and in turn enables an F10 flipflop 36 and may be provided by way of example as follows:

C1=001=Enables detectors D1, D2, D3, D4, D5

C2=010=Enables detectors D2, D3, D4, D5

C3=011=Enables detectors D3, D4, D5

C4=100=Enables detectors D4, D5

C5=101=Enables detectors D5 where

D1=12 db level detection report

D2=24 db level detection report

D3=36 db level detection report

D4=48 db level detection report

D5=60 db level detection report

The C terms are usually supplied by extraneous equipment to provide for specific sector or area scan when it is desirous for the radar operator to scan only a particular area, i.e., the area in which the target vehicle is located.

Outputs D1–D5 are coupled to logic gates 38 which in turn enable F11 flip flop 40.

F10 and F11 flipflops 36 and 40 have their outputs coupled to an azimuth counter 42 and an azimuth register 44 which are used to count and store the targets reported by the automatic threshold detector 12.

With reference to FIG. 2, there is shown logic circuitry for a single input threshold level wherein detector 12 may be any one of the aforesaid input levels. The output of threshold detector 12 is coupled to a flipflop 100 through associated logic wherein the input $Qi$ Q flipflops 100 are enabled by the following equation expressed in Boolean notations:

Set Q1=DT $\overline{F8}$ S1

Reset Q1=Q1

Set Q2=DT $\overline{F8}$ S2

Reset Q2=Q2

Set Q3=DT $\overline{F8}$ S3

Reset Q3=Q3

Set Q4=DT $\overline{F8}$ S4

Reset Q4=Q4

Set Q5=DT $\overline{F8}$ S5

Reset Q5=Q5

The output term S from threshold detector 12 is coupled as an enabling input to an AND gate 102. AND gate 102 is also enabled by an $\overline{F8}$ and a DT, wherein the DT indicates the radar dead time or that the radar is inoperable at any given time. The output of AND gate 102 is coupled to the set side of Q flipflop 100. The reset side of Q flipflop 100 is enabled by a Q term which indicates that when Q flipflop 100 is set true by the output of AND gate 102, it is immediately reset at the next clock time. The $\overline{F8}$ term emanates from F8 flipflop 104 which is set by the output of AND gate 106 and reset by the output of AND gate 108 wherein AND gate 106 is enabled by an $\overline{F8}$ and a DT and reset by an F8 and an LT which indicates radar live time. The following logic equation expressed in Boolean notations indicates that F8 flipflop 104 is enabled as follows:

Set F8=DT $\overline{F8}$

Reset F8=F8 LT

The output terms Q and $\overline{Q}$ from Q flipflop 100 are coupled to counter logic 16 and also to logic circuits 20, as shown in FIG. 1. Also coupled into counter logic 16 is the term F9 from an F9 flipflop 110. F9 flipflop 110 is enabled by the following logic equation:

Set F9=DT $\overline{F8}$

Reset F9=F9

For implementation of the above equation, flipflop F9 is set by the output of AND gate 112 and reset by an F9. AND gate 112 is enabled by an $\overline{F8}$ from F8 flipflop 104 and a DT.

Reversible counter logic 16 provides a plurality of outputs Xi, Yi and Zi, wherein Xi provides the least significant digit, Yi indicates the second least significant digit and Zi indicates the most significant digit of the counter. The i is used to indicate a selected one of the plurality of outputs of each threshold level used in this system. This counter and counter logic will be typical for all counters associated with each threshold level, and is enabled by the following logic equation:

Set Xi   =   F9 $\overline{Xi}$ [Zi $\overline{Yi}$ + $\overline{Ai}$ Qi $\overline{Zi}$ + Ai Qi Yi +

$\overline{Ai}\,\overline{Qi}$ Yi + Ai $\overline{Qi}$ Zi]

Reset Xi   =   $\overline{\text{Set Xi}}$ F9

-continued

Set Yi   =   F9 [Ai Qi + $\overline{Ai}\,\overline{Qi}$][$\overline{Zi}$ Yi Xi + Zi $\overline{Yi}\,\overline{Xi}$] +

F9 [Ai $\overline{Qi}$ + $\overline{Ai}$ Qi]

[$\overline{Yi}$ Xi + $\overline{Zi}$ Yi $\overline{Xi}$]

Reset Yi   =   $\overline{\text{Set Yi}}$ F9
Set Zi   =   F9 [Ai Qi + $\overline{Ai}\,\overline{Qi}$][Zi $\overline{Yi}$ + Zi Yi $\overline{Xi}$] +

F9 [$\overline{Ai}$ Qi + Ai $\overline{Qi}$][$\overline{Zi}$ Yi Xi + Zi $\overline{Xi}$]

Reset Zi   =   $\overline{\text{Set Zi}}$ F9

As shown in FIG. 3 counter 16 is comprised of three flipflops 120, 122 and 124 and provides the outputs Xi and $\overline{Xi}$ from Xi flipflop 120, the outputs Yi and $\overline{Yi}$ from Yi flipflop 122, and Zi and $\overline{Zi}$ from the Zi flipflop 124. Xi flipflop 120 is set by the output of an OR gate 128 which is enabled by the output of AND gate 130 or the output of OR gate 132. AND gate 130 is enabled by an F9 from F9 flipflop 110 and an Xi from the output of Xi flipflop 120, which will then hold Xi flipflop 120 true when it is already set during a continuous clock time which is provided by the term F9. OR gate 132 is enabled by the output of AND gate 136, 138, 140, 142 or 144, wherein AND gate 136 is enabled by $\overline{Zi}$ and Yi, AND gate 138 is enabled by an Ai, Qi and $\overline{Zi}$, AND gate 140 is enabled by an Ai, Qi and Yi, AND gate is enabled by an $\overline{Ai}$, $\overline{Qi}$ and Yi, and AND gate 144 is enabled by an Ai, Qi and Zi.

The A term emanates from the associated A flipflop 114 as shown in FIG. 2 which indicates that a target has been detected on the associated threshold detector 12. The operation of A flipflop will be explained in more detail as the disclosure proceeds. The Qi term indicates that flipflop 100 is presently detecting a target and a $\overline{Qi}$ indicates that no target is being presently detected in a selected threshold level.

Xi flipflop 120 is reset by the output of AND gate 146 which AND gate is enabled by an F9 term and the inverted output of OR gate 128 by the inverter 148.

Yi flipflop 122 which provides the output terms Yi and $\overline{Yi}$ is set by the output of OR gate 152 which OR gate is enabled by the output of AND gate 154 or the output of AND gate 156. AND gate 154 is enabled by an F9 term, the output of OR gate 158 and the output of OR gate 160. OR gate 158 is enabled by the output of AND gate 161 or the output of AND gate 162. AND gate 161 is enabled by an Ai and Qi and AND gate 162 is enabled by an $\overline{Ai}$ and a $\overline{Qi}$. OR gate 160 is enabled by the output of AND gate 166 or the output of AND gate 168. AND gate 166 is enabled by $\overline{Zi}$, Yi and an Xi, and AND gate 168 is enabled by a Zi, $\overline{Yi}$ and Xi.

The other enabling input to OR gate 152 emanates from the output of AND gate 156 which AND gate is enabled by an F9, the output of OR gate 170 and the output of OR gate 172. OR gate 170 is enabled by the output of AND gate 174 or the output of AND gate 176. AND gate 174 is enabled by an Ai, $\overline{Qi}$ and the AND gate 176 is enabled by an $\overline{Ai}$ and Qi. OR gate 172 is enabled by the output of AND gate 180 or the output of AND gate 182, wherein AND gate 180 is enabled by Yi and Xi and AND gate 182 is enabled by a $\overline{Zi}$, Yi and $\overline{Xi}$.

Zi flipflop 124 is set by the output of OR gate 186 which in turn is enabled by the output of AND gate 188 or the output of AND gate 190. AND gate 188 is enabled by the output of OR gate 192 or the output of OR gate 194. AND gate 190 is enabled by the output of OR gate 196 and the output of OR gate 198. OR gate 192 is enabled by an F9 term, the output of AND gate 200 or the output of AND gate 202. AND gate 200 is enabled by an Ai and a Qi. AND gate 202 is enabled by an $\overline{Ai}$ and $\overline{Qi}$. OR gate 194 is enabled by the output of AND gate 204 or the output of AND gate 206. AND gate 204 is enabled by Zi and $\overline{Yi}$. AND gate 206 is enabled by a Zi, a Yi and an Xi. OR gate 196 is enabled by the output of AND gate 208 or the output of AND gate 210. AND gate 208 is enabled by an Ai and a $\overline{Qi}$, and AND gate 210 is enabled by an $\overline{Ai}$ and a Qi. OR gate 198 is enabled by the output of AND gate 212 or the output of AND gate 214. AND gate 212 is enabled by a $\overline{Yi}$ and an Xi. AND gate 214 is enabled by the $\overline{Zi}$ term, a Yi and an $\overline{Xi}$.

The logic equation and the logic diagram shown in FIG. 3 illustrates a counter mechanism which is capable of counting targets detected by threshold detector Si 12 until a predetermined count therein is determined by the action bit A register 18 to be explained hereafter, which then records the A term. At this time counter 16 is reset to zero and proceeds to count up during each radar beam sweep that a threshold level is not detected.

A register 18 as shown in FIG. 1 comprises a plurality of flipflops Ai, which is enabled by the logic 20 to indicate that the contents of the associated Di counter gates 16 stores a predetermined content. For this particular embodiment, the content to determine when an Ai is to be enabled is the number 7.

The Ai flipflop 114 may therefore be enabled by the following equation:

Set Ai=$\overline{Ai}$ Qi Zi Yi

Reset Ai=Ai $\overline{Qi}$ Zi Yi

This equation can best be implemented by referring to the following implementation and with reference to FIG. 2. The set side of Ai flipflop 114 is enabled by the output of AND gate 218, which AND gate is enabled by an $\overline{Ai}$, a Qi from Qi flipflop 100, a Zi and a Yi. Ai flipflop 114 is reset by the output of AND gate 220 which in turn is enabled by an Ai, a $\overline{Qi}$ from the Qi flipflop 100, a Zi and a Yi.

Thus the logic enabling the inputs in the set and reset of Ai flipflop 114 provides that an Ai is generated when the contents of Di counter 16 reaches a binary level of 6 and a target has been declared by the presence of a Qi, while the counter is counting in a forward direction to later declare a leading edge of a target. An Ai will also be declared in the presence of a $\overline{Qi}$ or a target is not detected on a particular radar beam sweep when the counter reaches the binary level of 6 in the presence of an $\overline{Ai}$.

The first of the threshold detector 12 (12 db) sends a leading edge LE to an azimuth counter 42, FIG. 1, and an azimuth register 44 through an F10 flipflop 36 which are part of the associated radar computer. Because a radar antenna is normally not very symmetrical, a leading edge position report generated by LE edge gate 28 will replace the first report. This process of replacing last reports with next reports continues until the highest detector reports. The setting F0 flipflop 32 will then inhibit all trailing edge reports from the lower levels. The first time any of the detectors 12 generates a leading edge LE, F0 flipflop 32 will be reset.

Figure 8:
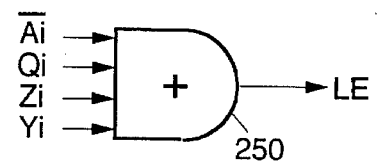
FIG. 8 and FIG. 9 are logic gates which display leading and trailing edges of the target displayed on the PPI scopes.
Figure 9:
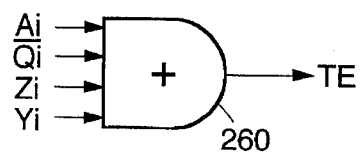

The following equation shows the implementation of the leading edge gates 28 and the trailing edge gates 30:

$LE1 = \overline{A1}\ Q1\ Z1\ Y1$  $\qquad TE1 = A1\ \overline{Q1}\ Z1\ Y1$
$LE2 = \overline{A2}\ Q2\ Z2\ Y2$  $\qquad TE2 = A2\ \overline{Q2}\ Z2\ Y2$
$LE3 = \overline{A3}\ Q3\ Z3\ Y3$  $\qquad TE3 = A3\ \overline{Q3}\ Z3\ Y3$
$LE4 = \overline{A4}\ Q4\ Z4\ Y4$  $\qquad TE4 = A4\ \overline{Q4}\ Z4\ Y4$
$LE5 = \overline{A5}\ Q5\ Z5\ Y5$  $\qquad TE5 = A5\ \overline{Q5}\ Z5\ Y5$ A sample of a typical leading edge gate is illustrated in FIG. 8 and a trailing edge gate is illustrated in FIG. 9, where an AND gate 250 is enabled by an action bit term Ai, a Qi from the Q logic gates 14, a Zi and a Yi from the D counter 16. The trailing edge gate 30 comprises an AND gate 260 which is enabled by an Ai term, a $\overline{Qi}$ term, a Zi and a Yi.

A leading edge is then generated and the contents of the D counter of any specific threshold level reaches a count of 6 or more, the action bit register 18 exhibits that a target has been declared and by Qi showing that a target has been detected at a particular radar beam sweep. While a trailing edge is generated by AND gate 260 under the same conditions as before with the exception that a target has not been detected by the presence of the $\overline{Qi}$.

The F11 flipflop 40 provides an output to the azimuth counter 242 and to the azimuth register 44 for storing signals at particular radar beam sweeps. The logic gates 38, which enable flipflop 40, are shown in FIG. 12, and this flipflop 40 is enabled by the following logic equation:

Set $F11$ = $C1\ LE1 + LE2\ (C1 + C2) +$
$LE3(C1 + C2 + C3) +$
$LE4\ (C1 + C2 + C3 + C4) +$
$LE5\ (C1 + C2 + C3 + C4 + C5)$
Reset $F11$ = $F11$ FIG. 12 implements the above logic equation by providing an OR gate 264 which has its output coupled to the set side of F11 flipflop 40. OR gate 264 is enabled by the output of AND gates 266, 268, 270, 272 or 274. AND gate 266 is enabled by LE1 and a C1 where C1 emanates from the control codes for indicating a particular segment which is to be scanned by the radar beam sweep and the particular portion is stored in the azimuth counter 42 and the azimuth register 44. AND gate 268 is enabled by an LE2 and the output from OR gate 276. OR gate 276 is enabled by C1 or a C2. AND gate 270 is enabled by an LE3 and the output from OR gate 278 which in turn is enabled by C1, C2 or C3. AND gate 272 is enabled by an LE4 and the output from OR gate 280. OR gate 280 is enabled by a C1, C2, C3 or a C4. Finally, AND gate 274 is enabled by the output of OR gate 282 and an LE5. OR gate 282 is enabled by a C1, C2, C3, C4 or C5.

Figure 4:
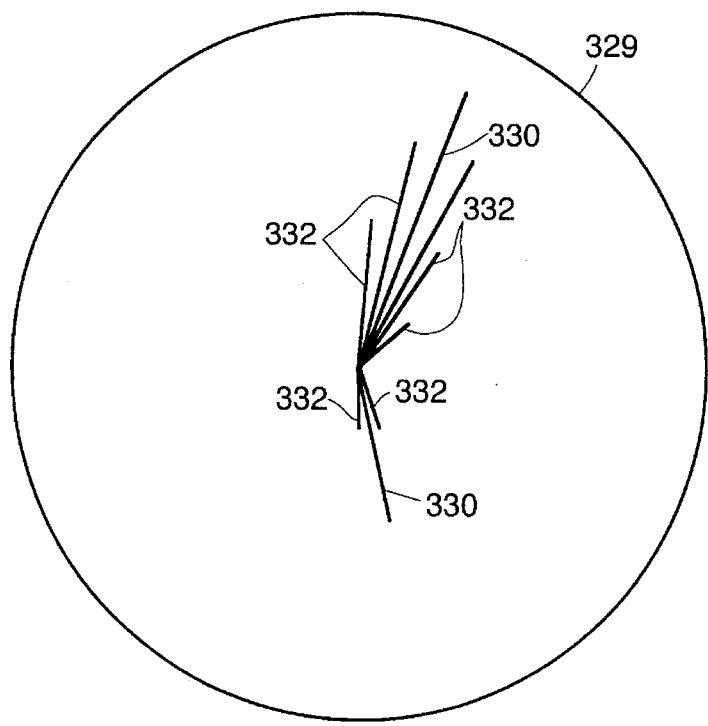
FIG. 4 is an illustration of the display scope of a PPI which shows the trailing edge type of display.
Figure 5:
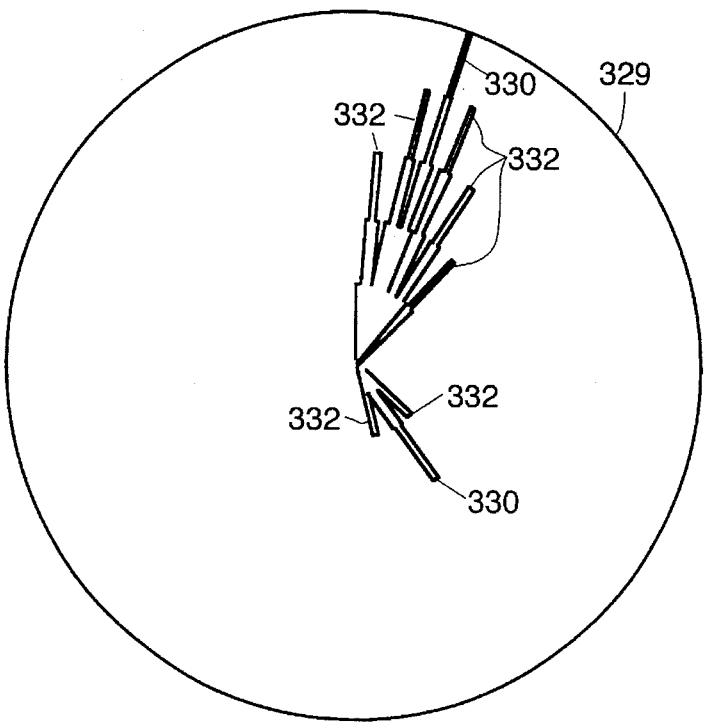
FIG. 5 is the display scope of a PPI which displays a real time azimuth strobe with varying lengths.

Therefore it can be seen that by proper selection of the control code inputs, the desired leading edge of the target can be displayed as shown in FIGS. 4 and 5. Note that FIG. 4 only displays trailing edge signals while FIG. 5 displays leading and trailing edges.

The F10 flip flop 36 is enabled by the output of logic gates 34. The logic gates 34 may be provided by the following equations:

Set $F10 = [TE1\ C1 + TE2\ (C1 + C1) +$
$TE3\ (C1 + C2 + C3) +$
$TE4\ (C1 + C2 + C3 + C4) +$
$TE5\ (C1 + C2 + C3 + C4 + C5)]\ \overline{F0}$ Reset $F10 = F10$ The above equation comprises an AND gate 300 (FIG. 11) which is enabled by an $\overline{F0}$ from F0 flip flop 32 and the output of OR gate 302. OR gate 302 is enabled by the output of AND gate 304, 306, 308, 310 or 312. AND gate 304 is enabled by a TE1 from the TE gate 30 and a C1 from the control codes. AND gate 306 is enabled by a TE2 and the output of OR gate 314 which is enabled by a C1 or a C2. AND gate 308 is enabled by a TE3 and the output of OR gate 316. OR gate 316 is enabled by a C1, C2 or C3. AND gate 310 is enabled by TE4 and the output of OR gate 318, which in turn is enabled by C1, C2, C3 or C4. And finally, AND gate 312 is enabled by TE5 and the output of OR gate 320, which in turn is enabled by C1, C2, C3, C4 or C5. The other enabling input to AND gate 300 emanates from the F0 flip flop 32 which in turn is enabled by the following equation:

Set $F0=(TE1+TE2+TE3+TE4+TE5)$

Reset $F0=(LE1+LE2+LE3+LE4+LE5)$

Flip flop 32 is set by the output of OR gate 322 which in turn is enabled by TE1, TE2, TE3, TE4 or TE5 from the trailing edge gates 30. F0 flip flop 32 is reset by the output of OR gate 324 which in turn is enabled by an LE1, LE2, LE3, LE4 or LE5 from the leading edge gates 28.

F10 flip flop 36 is therefore set on a trailing edge signal from edge gate 30 during each selected sector scan from the control code C. When a leading edge is first generated by the leading edge gate 28 all trailing edge reports are inhibited. For displaying the leading edge and trailing edge or only the trailing edge, a plurality of range gates in the form of range flip flops F1–F5 is provided for display as shown in FIG. 4 and FIG. 5. FIG. 4 shows only trailing edges of mainlobes and sidelobes, where the mainlobe is illustrated on the PPI scope, for example, by the numeral 330, and the sidelobes being shorter in amplitude are denoted by the numeral 332. FIG. 5 illustrates both the trailing edge and the leading edge of the mainlobes and the sidelobes at selected range intervals where the range intervals are shown as steps in the lobes.

Figure 7:
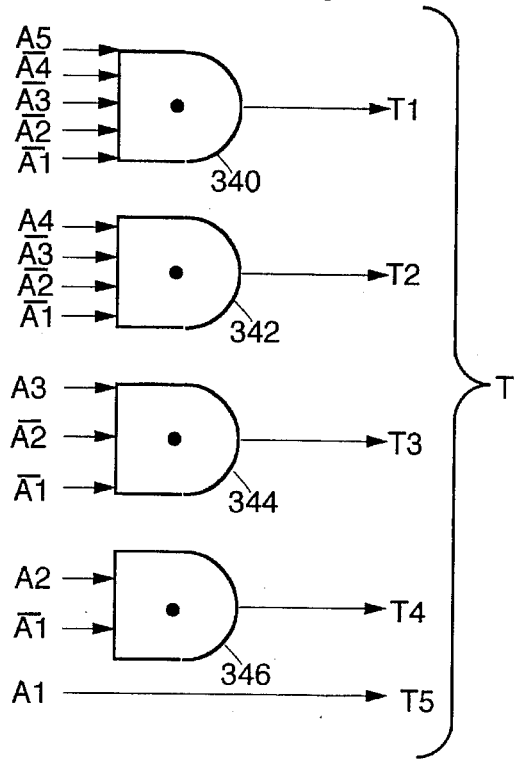
FIG. 7 is an illustration of logic gates T1–T5.

These lobes are synthetically reproduced by the range logic 336, shown in FIG. 1, which is enabled by the LE output of leading edge gate 28, the TE logic from the trailing edge gates 30 in a time relationship T provided by time gates 22. The time gates signal T1–T5 is generated through the logic provided by the output from the bit register A. The following equations illustrate the enabling of the time gate logic 22:

$T1=A5\ \overline{A4}\ \overline{A3}\ \overline{A2}\ \overline{A1}$ $T2=A4\ \overline{A3}\ \overline{A2}\ \overline{A1}$ $T3=A3\ \overline{A2}\ \overline{A1}$ $T4=A2\ \overline{A1}$ $T5=A1$ FIG. 7 illustrates the typical time gates T1–T5 as in the form of AND gates where AND gate 340 is enabled by an A5, $\overline{A4}$, $\overline{A3}$, $\overline{A2}$ and an $\overline{A1}$, to provide the output T1. AND gate 342 is enabled by an A4, $\overline{A3}$, $\overline{A2}$ and $\overline{A1}$ to provide the output T2. AND gate 344 is enabled by an A3, $\overline{A2}$ and $\overline{A1}$ and provides the output T3. AND gate 346 is enabled by an A2 and an $\overline{A1}$ and provides the output T4. And finally T5 is provided directly by the term A1. These gates generally provide the output T which is coupled directly into the range logic 336 for enabling the range flipflops F1–F5.

The range flipflops F1–F5 are generally indicated by an Fi as shown in FIG. 10, where the F1–F5 flipflops may be enabled by the following equations:

Set $F1=\overline{R}40\ B\ [T1\ \overline{F8}+T1\ F8\ DT]+TE1\ \overline{B}$

Reset $F1=R40$

Set $F2=\overline{R}80\ B\ [T2\ \overline{F8}+T2\ F8\ DT]+TE2\ \overline{B}$

Reset $F2=R80$

Set $F3=\overline{R}120\ B\ [T3\ \overline{F8}+T3\ F8\ DT]+TE3\ \overline{B}$

Reset $F3=R120$

Set $F4=\overline{R}160\ B\ [T4\ \overline{F8}+T4\ F8\ DT]+TE4\ \overline{B}$

Reset $F4=R160$

Set $F5=\overline{R}200\ B\ [T5\ \overline{F8}+T5\ F8\ DT]+TE5\ \overline{B}$

Reset $F5=R200$

With reference to FIG. 10, the set side of Fi flipflop 340 is set by the output from OR gate 342 while OR gate 342 is enabled by the output of AND gate 344 or the output of AND gate 346. AND gate 344 is enabled by an $\overline{Ri}$, a B and the output of OR gate 348. Ri indicates the selected range from external selection circuitry which may be of any desired range increments, for example, F1 flipflop is enabled by R40 and the 40 indicates the desired range. The B is the output from a toggle switch for displaying only the jamming outline as shown in FIG. 5, and the $\overline{B}$ displays trailing edges only as shown in FIG. 4. OR gate 348 is enabled by the output of AND gate 350 or the output of AND gate 352. AND gate 350 is enabled by Ti which indicates a selected threshold level from the time gates 22 and an $\overline{F8}$. AND gate 352 is enabled by Ti, an F8 and a DT. AND gate 346 is enabled by a $\overline{B}$ for displaying trailing edges only and a TE1 indicating that a trailing signal is present. The outputs provided by the F1–F5 flipflops are coupled directly into the logic gates 356 for enabling the F7 flipflop 358 which provides an output for displaying the synthetic created signal to a display scope 360 through a suitable display circuitry 362. A logic circuitry provided by the logic gates 356 is shown in FIG. 6 and is enabled by the following equation:

Set $F6 = (LE1 + LE2 + LE3 + LE4 + LE5 + TE1 + TE2 + TE3 + TE4 + TE5)$

Reset $F6 = LT\ \overline{F8}$

Set $F7 = B\ F6\ (F1 + F2 + F3 + F4 + F5) +$
$B\ \overline{F6}\ (T1\ R40 + T2\ R80 + T3\ R120 + T4\ R160 + T5\ R200) + \overline{B}\ [F1 + F2 + F3 + F4 + F5]$ Reset $F7 = \overline{Set\ F7}$ F7 flipflop 358 Is enabled by the output of OR gate 364 and reset by the inverted output of AND gate 364 through inverter 366. OR gate 364 is enabled by the output of AND gate 368, the output of AND gate 370 or the output of AND gate 372. AND gate 368 is enabled by the output of F6 flipflop 376, a B term and the output of AND gate 378. AND gate 378 is enabled by Ti from the time gate logic 22 and an Ri indicated range increment. AND gate 370 is enabled by a B, the output from the F6 term from F6 flipflop 376 and the output of OR gate 380. AND gate 372 is enabled by a $\bar{B}$ and the output of OR gate 380. OR gate 380 is enabled by an F1, F2, F3 or F5.

F6 flipflop 376 is enabled by the logic gates 382 as shown in FIGS. 1 and 6, where the set side of flipflop 376 is enabled by the output of OR gate 384 and reset by the output of AND gate 386. OR gate 384 is enabled by an LE1, LE2, LE3, LE4 or LE5. OR gate 384 may also be enabled by OR gate 390 which in turn is enabled by a TE1, TE2, TE3, TE4 or TE5. AND gate 386 is enabled by an LT indicating radar live time and an $\overline{F8}$.

The leading edge signal from LE gate 28 and the trailing edge signal from TE gate 30 are presented to a serial adder 392 and are added together. The output from adder 392 is presented to a divide-by-2 divider and the signal in any selected threshold level is beamsplit. The output from divider 394 is then presented to a tracking computer for establishing a more accurate target position.

The aforesaid objects are thus accomplished by the preferred embodiment of this invention and having explained but one preferred embodiment thereof,

What is claimed is:

1. A digital data processor including a display means for displaying the data processed comprising:

a plurality of analog threshold detectors, each detector of said plurality having an output circuit and an input circuit;

a converter, said converter having an input circuit coupled to each output circuit of each detector of said plurality, said converter having an output circuit;

a counter, said counter having an input circuit coupled to the output circuit of said converter and an output circuit;

a storage register, said register having an input circuit coupled to the output circuit of said counter, and an output circuit;

a display device, said display device having an input circuit; and display logic, having an output circuit said display logic having its output circuit coupled to the input circuit of said display device, said display logic having an input circuit coupled to the output circuit of said storage register.

2. The digital data processor as defined in claim 1 wherein each detector of said plurality includes means for varying and increasing the threshold level thereof for detecting analog signals of differing levels.

3. The digital data processor as defined in claim 1 wherein:

said converter includes means for converting the signals applied to the input circuit of said threshold detectors to a digital indication thereof.

4. The digital data processor as defined in claim 1 wherein:

each detector of said plurality includes means for varying and increasing the threshold level thereof for detecting analog signals of differing levels; and said converter includes means for converting the analog signals of said threshold detectors to a digital indication thereof.

5. The digital data processor as defined in claim 1 wherein:

said counter is a reversible up-down counter which counts in a first direction when an input signal is applied to the input circuit of said threshold detectors is of a first state and counts in a second direction when the input signal is of a second state.

6. The digital data processor as defined in claim 1 wherein:

said counter is a reversible up-down counter which counts in a first direction when an input signal is applied to the input circuit of said threshold detectors is of a first state and counts in a differing direction when the input signal is of a second state; and said converter includes means for converting the signals applied to the input circuit of said threshold detector to a digital indication thereof.

7. The digital data processor as defined in claim 1 wherein:

each detector of said plurality includes means for varying and increasing the threshold level thereof for detecting analog signals of differing levels; and said counter is a reversible up-down counter which counts in a first direction when an input signal is applied to the input circuit of said threshold detector is of a first state and counts in a second state when the input signal is of a second state.

8. The digital data processor as defined in claim 1 wherein:

each detector of said plurality includes means for varying and increasing the threshold level thereof for detecting analog signals of differing levels;

said converter includes means for converting the analog signals, detected by said threshold detector to a digital indication thereof in the form of binary 1s and 0s during predetermined times; and said counter is a binary reversible up-down counter which increments up one bit on each binary 1 from said converter and increments down one bit on a binary 0 from said converter.

9. In a signal receiving system capable of displaying real time data input indicative of electronic countermeasure environments:

a receiving antenna;

a plurality of input means coupled to said antenna for receiving analog signal input information of changing values indicative of electronic countermeasure environments;

an automatic analog threshold detector coupled to each of said plurality of input means, each said automatic analog threshold detectors Raving a threshold value of predetermined and increasing levels, said detector having an output circuit;

an analog to digital converter coupled to the output circuit of said detector, said converter being capable of converting the analog information detected by said detector to a digital value indicative thereof, said converter having an output circuit;

a reversible up-down counter capable of counting and storing digital data, said reversible counter being coupled to the output circuit of said converter, said counter having an output circuit;

a gating circuit, said gating circuit being coupled to the output circuit of said counter, said gating circuit including an output circuit which is enabled when the contents stored in said counter reaches a predetermined count;

display logic, said display logic being enabled by said gated circuit when the contents stored in said counter reaches a predetermined count; and a display device, said display device being enabled by said display logic.

10. In the receiving system as defined in claim 9 wherein:

said counter includes logic circuit means for causing the contents of said counter to increase in a first direction on each receiving beam sweep of said antenna when a target is detected and decrease in a second direction on each receiving beam sweep of said antenna when no target is detected.

11. In the receiving system as defined in claim 10 wherein:

said logic means further includes means for resetting the contents of said counter to zero when the contents thereof reaches a predetermined count.

12. In the receiving system as defined in claim 11 wherein:

said logic means further includes means for causing the contents of said counter to increase on each receiving beam sweep when no target is detected and decrease on each receiving beam sweep when a target is detected after said counter has been reset to zero when the contents of said counter reaches the predetermined count.

13. A radar tracking system for displaying countermeasure vehicles in the presence of jamming noise environments comprising:

a detection means for detecting an input signal on a plurality of input channels and enabling a predetermined output channel of a plurality of output channels according to the threshold signal level applied to the input channels;

a counting means for counting and storing the accumulation of input signals, said counting means having an input channel coupled to each output channel of the plurality of output channels of said detection means; and a gating logic circuit, said gating logic circuit being coupled to the output channels of said counting means and being enabled when the contents stored in said counting means reaches a predetermined count.

14. The radar tracking system as defined in claim 13 and further comprising:

logic means for causing the contents of said counting means to increment in a first direction each radar beam sweep that a countermeasure vehicle is detected and increment in a second direction each radar beam sweep a countermeasure vehicle is not detected.

15. The radar tracking system as defined in claim 14 wherein:

said logic means includes means for causing the contents of said counting means to be reset to zero when a predetermined count is attained and said gating logic is enabled.

16. A digital data processor comprising:

an analog threshold detector, said detector having an input circuit for receiving analog input signals, and an output circuit;

an analog-to-digital converter, said converter having an input circuit coupled to the output circuit of said detector and an output circuit, said converter being capable of converting the analog input signals to a binary 1 if the input signal reaches a predetermined threshold level during a predetermined time period, and a binary 0 if the input signal is below the predetermined threshold level during the predetermined time period;

a reversible counting register, said register having an input circuit coupled to the output circuit of said converter, and an output circuit, said counting register being capable of counting and storing the accumulations of the binary 1s and 0s from said converter; and a bit register, said bit register having an input circuit coupled to the output circuit of the said counting register, said bit register having an output circuit coupled to said counting register for resetting said counting register to 0 when the contents of said counting register reaches a predetermined count.

17. The digital data processor as defined in claim 16 and further comprising:

a storage register, said storage register coupled to the output circuit of said bit register, said storage register being capable of storing a signal from said bit register when the predetermined contents therein is reached and said counting register is reset to 0.

18. The digital data processor as defined in claim 16 and further comprising:

a display device, said display device being responsive to the output of said bit register.

19. The digital data processor as defined in claim 16 and further comprising:

a storage register, said storage register having an input circuit coupled to the output circuit of said bit register, said storage register being capable of storing the contents of said storage register when the predetermined contents therein is reached and said counting register is reset to 0; and a display device, said display device being responsive to the contents of said storage register.

20. A digital data processor comprising:

a binary counter, said binary counter being capable of counting in a first mode and a second mode, said counter having an input path and an output path;

first logic means for causing said binary counter to count in a first mode wherein said binary counter counts up each time a binary input of a first significance is applied to the input path of said binary counter and counts down each time a binary input of a second significance is applied to the input path of said binary counter, said first logic means being coupled to the input path of said binary counter;

second logic means for resetting the contents of said binary counter to a minimal count each time the contents thereof reaches a predetermined count; and third logic means for causing said binary counter to count in the second mode wherein said binary counter counts down each time a binary input of a first significance is applied to the input path of said binary counter and counts down each time a binary input of a second significance is applied to the input path of said binary counter after said second logic means resets the contents of said first logic means to a minimal count and the predetermined count has been reached in said binary counter.

21. The digital data processor as defined in claim 20 and further comprising:

a first gate, said first gate having an input path coupled to said binary counter and an output path, said first gate including logic means for enabling said first gate when the contents of said binary counter reaches the predetermined count in the first mode; and a second gate, said second gate having an input path coupled to said binary counter and an output path, said second gate including logic means for enabling said second gate when the contents of said binary counter reaches the predetermined count in the second mode.

22. The digital data processor as defined in claim 21 and further comprising:

an adder, said adder having a first input path coupled to the output path of said first gate and a second input path coupled to the output path of said second gate and having an output path; and a divider, said divider being coupled to the output path of said adder and having an output path capable of providing an output signal indicative of the average of said binary counter when operating in the first mode and the contents of said binary counter when operating in the second mode.

23. In a radar system for beamsplitting radar data returns:

a plurality of input means for receiving radar return data of changing values;

a plurality of automatic threshold detectors being coupled to a corresponding one of said plurality of input means;

a plurality of counters, each one of said plurality of counters being responsive to a corresponding one of said plurality of detectors, said counters being capable of counting in a first and a second mode;

means for causing the said counters to count in the first mode when the contents of said counters reaches a predetermined count in a first instance and to count in the second mode when the contents of said counters reaches a predetermined count in a second instance, said means including means to cause the counters to be reset to a minimal count when the contents of said counters reaches the predetermined count; and means for averaging the contents of selected ones of said plurality of counters at selected intervals.

24. In combination with a receiving system, including a receiving antenna a digital data processor for beamsplitting adjacent received energy data, said processor comprising:

a plurality of received energy data input means for providing digital outputs of a first significance to indicate a valid target upon a single antenna sweep and digital outputs of a second significance to indicate an invalid target on a single antenna sweep;

a plurality of storage means for accumulating the data inputs from said received energy, each one of said plurality of storage means being coupled to a corresponding one of said plurality of received energy data input means; and means for averaging the accumulations of data inputs of selected ones of said plurality of storage means.

25. In the combination as defined in claim 24, each of said plurality of received energy input means comprises:

an analog automatic threshold detector having an output path, and an analog-to-digital converter, said converter having an input path coupled to the output path of said detector and an output path.

26. In the combination as defined in claim 24, each said storage means comprises:

a digital reversible counter, said counter being responsive to the digital outputs of said data input means, and including first logic means for causing the counter to count up n increments each time said input means indicates a valid target is detected and count down n increments each time said input means indicates no valid target is detected, and second logic means for causing the contents of said counter to count down n increments each time said input means indicates a target is indicated and count up n increments each time said input means indicates no target is detected after the contents of said counter reaches a predetermined count.

27. In the combination as defined in claim 24, wherein:

each of said plurality of received energy input means comprises an analog automatic threshold detector having an output path, and an analog-to-digital converter, said converter having an input path coupled to the output path of said detector and an output path; and each said storage means comprises a binary reversible counter, said counter having an input path coupled to the output path of said analog-to-digital converter, and including first logic means for causing the counter to count up n increments each time said input means indicates a target is detected and count down n increments each time said input means indicates no target is detected, and second logic means for causing the contents of said counter to count down n increments each time said input means indicates a target is indicated and count up n increments each time said input means indicates no target is detected after the contents of said counter reaches a predetermined count.

\* \* \* \* \*